United States Patent
Chen et al.

(10) Patent No.: US 10,792,647 B2
(45) Date of Patent: Oct. 6, 2020

(54) BASE METAL CATALYSTS FOR THE OXIDATION OF CARBON MONOXIDE AND VOLATILE ORGANIC COMPOUNDS

(75) Inventors: Hai-Ying Chen, Conshohocken, PA (US); Arthur J. Reining, Christiana, PA (US); Paul J. Andersen, Plymouth Meeting, PA (US); Rita Aiello, King of Prussia, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 12/427,375

(22) Filed: Apr. 21, 2009

(65) Prior Publication Data

US 2010/0266473 A1  Oct. 21, 2010

(51) Int. Cl.
| | |
|---|---|
| B01D 53/44 | (2006.01) |
| B01D 53/62 | (2006.01) |
| B01J 21/08 | (2006.01) |
| B01J 23/10 | (2006.01) |
| B01J 23/889 | (2006.01) |

(Continued)

(52) U.S. Cl.
CPC ........ B01J 23/8892 (2013.01); B01D 53/864 (2013.01); B01D 53/8668 (2013.01); B01J 23/002 (2013.01); B01J 35/04 (2013.01); B01D 2255/2073 (2013.01); B01D 2255/20738 (2013.01); B01D 2255/20746 (2013.01); B01D 2255/20753 (2013.01); B01D 2255/20761 (2013.01); B01D 2255/407 (2013.01);
(Continued)

(58) Field of Classification Search
CPC ............. B01D 53/864; B01D 53/8668; B01D 2257/708; B01D 2257/502; B01D 2255/2073; B01D 2255/20746; B01D 2255/20761; B01D 2523/17; B01D 2523/3712; B01D 2523/72; B01J 35/04; B01J 23/8892; B01J 23/002; B01J 23/72; B01J 2523/00
USPC ........................... 423/246, 247, 245.1, 245.3
See application file for complete search history.

(56) References Cited

U.S. PATENT DOCUMENTS

| | | | |
|---|---|---|---|
| 3,956,189 A | 5/1976 | Warshaw et al. | |
| 4,059,675 A | 11/1977 | Yang et al. | |

(Continued)

FOREIGN PATENT DOCUMENTS

| | | |
|---|---|---|
| CN | 1072109 A | 5/1993 |
| CN | 1915475 | 2/2007 |

(Continued)

OTHER PUBLICATIONS

Chen et al, "High temperature thermal stabilization of alumina modified by lanthanum species", Applied Catalysis A: General 205 (2001) pp. 159-172.*

(Continued)

Primary Examiner — Ngoc-Yen Nguyen (57) ABSTRACT

A method for oxidizing carbon monoxide (CO) and volatile organic compounds (VOCS) comprises contacting a gas containing water vapor and said CO and VOCs with a catalyst composition comprising at least one base metal promoter and at least one base metal catalyst supported on an oxide support material comprising one or more of alumina, silica, zirconia, ceria, and titania, wherein the VOCs comprise one or more of methyl acetate, methane, methyl bromide, benzene, methanol, methyl ethyl ketone, butane, and butene.

13 Claims, 11 Drawing Sheets

(51) Int. Cl.
*B01D 53/86* (2006.01)
*B01J 35/04* (2006.01)
*B01J 23/00* (2006.01)

(52) U.S. Cl.
CPC .. *B01D 2257/502* (2013.01); *B01D 2257/708* (2013.01); *B01J 2523/00* (2013.01)

(56) References Cited

U.S. PATENT DOCUMENTS

| | | |
|---|---|---|
| 4,059,677 A | 11/1977 | Sare et al. |
| 4,429,155 A | 1/1984 | Göetz et al. |
| 4,585,752 A | 4/1986 | Ernest |
| 4,857,499 A | 8/1989 | Ito et al. |
| 4,927,799 A | 5/1990 | Matsumoto et al. |
| 4,956,328 A | 9/1990 | Frohning et al. |
| 4,968,660 A | 11/1990 | Tijburg et al. |
| 5,063,193 A | 11/1991 | Bedford et al. |
| 5,176,897 A | 1/1993 | Lester |
| 5,204,309 A * | 4/1993 | Vorob'iev et al. ............ 502/306 |
| 5,254,519 A | 10/1993 | Wan et al. |
| 5,276,249 A | 1/1994 | Greene et al. |
| 5,292,704 A | 3/1994 | Lester |
| 5,451,388 A | 9/1995 | Chen et al. |
| 5,578,283 A | 11/1996 | Chen et al. |
| 5,643,545 A * | 7/1997 | Chen et al. ................ 423/245.3 |
| 5,849,659 A | 12/1998 | Tanaka et al. |
| 5,895,636 A | 4/1999 | Nguyen et al. |
| 6,005,143 A | 12/1999 | Machado et al. |
| 6,022,825 A | 2/2000 | Andersen et al. |
| 6,051,198 A | 4/2000 | Sano et al. |
| 6,096,278 A | 8/2000 | Gary |
| 6,207,120 B1 | 3/2001 | Belmonde et al. |
| 6,239,064 B1 * | 5/2001 | Nguyen et al. ............... 502/328 |
| 2002/0064492 A1 | 5/2002 | Cremona et al. |
| 2005/0081443 A1 | 4/2005 | Aiello et al. |
| 2007/0259779 A1 * | 11/2007 | Collier et al. ................ 502/232 |
| 2008/0112871 A1 | 5/2008 | Obayashi et al. |
| 2008/0226524 A1 * | 9/2008 | Alive et al. ................ 423/213.2 |

FOREIGN PATENT DOCUMENTS

| | | |
|---|---|---|
| DE | 37 40 091 A1 | 6/1989 |
| EP | 0 139 051 A1 | 5/1985 |
| EP | 0 421 878 A1 | 4/1991 |
| EP | 0 428 753 A1 | 5/1991 |
| EP | 0 547 226 A1 | 6/1993 |
| EP | 0 888 807 A1 | 1/1999 |
| EP | 1 063 002 A2 | 12/2000 |
| EP | 1 086 739 A2 | 3/2001 |
| EP | 1 199 096 A1 | 4/2002 |
| GB | 2 213 073 A | 8/1989 |
| IE | 903547 | 4/1991 |
| JP | 53012768 A | 4/1978 |
| JP | S60222145 A | 11/1985 |
| JP | 7-299329 A | 11/1995 |
| JP | 7-323214 A | 12/1995 |
| JP | 08257362 A | 8/1996 |
| JP | H08257362 A | 10/1996 |
| JP | 09047661 A | 2/1997 |
| JP | 10151348 | 6/1998 |
| JP | H111697281 A | 6/1999 |
| JP | 2000-167406 A | 6/2000 |
| JP | 2002054427 A | 2/2002 |
| JP | 2002191978 A | 7/2002 |
| KR | 10-2005-0069178 A | 7/2005 |
| UA | 19718 U | 12/2006 |
| WO | WO-95/11726 A1 | 5/1995 |
| WO | 199639243 A1 | 12/1996 |
| WO | WO-97/18892 A1 | 5/1997 |
| WO | WO-98/45026 A1 | 10/1998 |
| WO | WO-01/45833 A1 | 6/2001 |
| WO | WO-03/101612 A2 | 12/2003 |
| WO | WO 2007143837 A1 * | 12/2007 |
| WO | WO2009021850 A1 | 2/2009 |

OTHER PUBLICATIONS

James J. Spivey, "Complete Catalytic Oxidation of Volatile Organics," *Ind. Eng. Chem. Res.*, vol. 26, No. 11, Nov. 1987, pp. 2165-2180.

J. J. Spivey et al., "Literature Review: Deactivation of Catalysts in the Oxidation of Volatile Organic Compounds," *Catalysis Today*, vol. 11, No. 4, Jan. 22, 1992, pp. 465-500.

M. Törncrona et al., "Low temperature catalytic activity of cobalt oxide and ceria promoted Pt and Pd:—influcence of pretreatment and gas composition," *Applied Catalysis B: Environmental*, vol. 14, 1997, pp. 131-145.

Francesca Zamar et al., "$CeO_2$-based Solid Solutions with the Fluorite Structure as Novel and Effective Catalysts for Methane Combustion," *J. Chem. Soc., Chem. Commun.*, 1995, pp. 965-966.

Manon M. R. Feijen-Jeurissen et al., "Mechanism of catalytic destruction of 1,2-dichloroethane and trichloroethylene over $\gamma$-$Al_2O_3$ and $\gamma$-$Al_2O_3$-supported chromium and palladium catalysts," *Catalysis Today*, vol. 54, No. 1, Nov. 26, 1999, pp. 65-79.

George R. Lester, "Catalytic destruction of hazardous halogenated organic chemicals," *Catalysis Today*, vol. 53, No. 3, Nov. 5, 1999, pp. 407-418.

G. Sinquin et al., "Perovskites as polyvalent catalysts for total destruction of $C_1$, $C_2$ and aromatic chlorinated volatile organic compounds," *Catalysis Today*, vol. 54, No. 1, Nov. 26, 1999, pp. 107-118.

Zhou Xueliang et al, edited, "Handbook of Fine Chemical Products—Catalyst", Fine Chemical Industry Publishing Center of Chemical Industry Press, the 1st in Nov. 2002, publication date: Nov. 30, 2002, p. 153 paragraph 1 from the bottom).

* cited by examiner

Figure 7b

BASE METAL CATALYSTS FOR THE OXIDATION OF CARBON MONOXIDE AND VOLATILE ORGANIC COMPOUNDS

FIELD OF THE INVENTION

This invention relates to a method and catalyst composition for treating emissions from industrial and commercial processes.

BACKGROUND OF THE INVENTION

Catalytic oxidation is widely used to control carbon monoxide (CO) and volatile organic compound (VOC) emissions from industrial processes. Most of the catalysts are supported noble metals because of their high catalytic activity, good thermal stability, and excellent resistance to chemical poisoning. For applications that require a large volume of catalysts, the use of noble metal oxidation catalysts requires a large amount of capital investment for noble metals. For example, a typical unit for catalytic oxidation of the tail-gas in purified terephthalic acid (PTA) process needs 300 ft$^3$ of noble metal catalysts at a loading of 50 g/ft$^3$ platinum (Pt) and 30 g/ft$^3$ palladium (Pd), which would require about 482 oz. of Pt and 289 oz. of Pd. Therefore, there is a strong desire to develop alternative catalysts that have activity and durability at least comparable to the noble metal catalysts.

SUMMARY OF THE INVENTION

According to one embodiment of the present invention, a method for oxidizing carbon monoxide (CO) and volatile organic compounds (VOCS) comprises contacting a gas containing water vapor and said CO and VOCs with a catalyst composition comprising at least one base metal promoter and at least one base metal catalyst supported on an oxide support material comprising one or more of alumina, silica, zirconia, ceria, and titania. The VOCs comprise one or more of methyl acetate, methane, methyl bromide, benzene, methanol, methyl ethyl ketone, butane, and butene.

According to another embodiment of the present invention, a method for oxidizing carbon monoxide (CO) and volatile organic compounds (VOCs) comprises the step of contacting a gas containing water vapor and the CO and VOCs with a catalyst composition consisting essentially of at least one base metal promoter and at least one base metal catalyst supported on an oxide support material comprising one or more of alumina, silica, zirconia, ceria, and titania. The VOCs comprise one or more of methyl acetate, methane, methyl bromide, benzene, methanol, methyl ethyl ketone, butane, and butene.

According to another embodiment of the present invention, a catalyst composition for the oxidation of carbon monoxide (CO) and volatile organic compounds (VOC) comprises at least one base metal promoter and at least one base metal catalyst supported on an oxide support material comprising one or more of alumina, silica, zirconia, ceria, and titania.

According to another embodiment of the present invention, a catalyst composition for the oxidation of carbon monoxide (CO) and volatile organic compounds (VOC) consists essentially of at least one base metal promoter and at least one base metal catalyst supported on an oxide support material comprising one or more of alumina, silica, zirconia, ceria, and titania.

BRIEF DESCRIPTION OF THE DRAWINGS

The invention may be understood from the following detailed description when read in connection with the accompanying drawing. Included in the drawing are the following figures.

DETAILED DESCRIPTION OF THE INVENTION

Aspects of the present invention include methods for oxidizing and catalyst compositions for the oxidation of carbon monoxide (CO) and volatile organic compounds (VOC). According to one embodiment, a method for oxidizing carbon monoxide (CO) and volatile organic compounds (VOCs) comprises contacting a gas containing water vapor and said CO and VOCs with a catalyst composition comprising at least one base metal promoter and at least one base metal catalyst supported on an oxide support material comprising one or more of alumina, silica, zirconia, ceria, and titania, wherein the VOCs comprise one or more of methyl acetate, methane, methyl bromide, benzene, methanol, methyl ethyl ketone, butane, and butene. According to another embodiment, a method for oxidizing carbon monoxide (CO) and volatile organic compounds (VOCs) comprises contacting a gas containing water vapor, CO, and VOCs with a catalyst composition consisting essentially of at least one base metal catalyst supported on an oxide support material comprising one or more of alumina, silica, zirconia, ceria, and titania, wherein the VOCs comprise one or more of methyl acetate, methane, methyl bromide, benzene, methanol, methyl ethyl ketone, butane, and butene.

Catalytic oxidation is widely used to control VOC and CO emissions from industrial and commercial processes. A method for oxidizing carbon monoxide (CO) and volatile organic compounds (VOCs) utilizes a catalyst in contact with a gas containing at least water vapor, CO, and VOCs. The gas may include VOCs such as saturated and unsaturated hydrocarbons, aromatic hydrocarbons, polyhalogenated derivatives thereof, such as halocarbons, dioxins, and hydrocarbons containing one or more sulfur, oxygen, nitrogen, phosphorous, or bromine atoms. The gas may be emitted from an industrial or commercial process. According to one embodiment, the gas may be the tail-gas of a process for producing purified terephthalic acid (PTA).

In a commercial process for producing PTA, terephthalic acid may be produced by oxidation of p-xylene by oxygen using acetic acid as a solvent. This may occur in the presence of a catalyst such as cobalt-manganese using a bromide promoter. The product may be purified by hydrogenation while in a water solution and may then be cooled. The tail-gas in a purified terephthalic acid (PTA) process may comprise oxygen, nitrogen, nitrogen oxides, methyl bromide, benzene, methane, carbon monoxide, methyl acetate, and water. Specifically, a typical PTA process may include 30 parts per million (ppm) methyl bromide, 10 ppm benzene, 100 ppm methane, 1000 ppm carbon monoxide, 500 ppm methyl acetate, 1.5% water, 4% oxygen, and the balance nitrogen. In addition to the constituents listed above, a catalyst according to an embodiment of the present invention may also oxidize and convert other volatile organic compounds such as methyl ethyl ketone, methanol, butane, or butene.

PTA processes may have about 2% steam/water. The catalyst and support must be stable and able effectively to function in an environment with moisture. Certain catalysts and supports, such as zeolites, are known to degrade under hydrothermal conditions, especially over a period of time. Catalyst compositions of the present invention, however, are able to withstand and work effectively in a gas containing water vapor.

When the gas, such as a tail-gas from PTA, containing water vapor, CO, and VOCs, is contacted with a catalyst composition according to embodiments of the present invention, the carbon monoxide (CO) and volatile organic compounds (VOCs) are oxidized. The process effluent may be preheated and passed through a catalyst bed in the presence of excess oxygen and the polluting components in the stream are oxidized to carbon dioxide ($CO_2$), water ($H_2O$) and hydrogen bromide. Hydrogen bromide from downstream of the catalyst can be easily removed from the effluent by passing the gas through a caustic scrubber, thus removing the pollutants from effluent before emitting the exhaust to the atmosphere. Embodiments of the present invention have been shown to convert methyl bromide, benzene, and carbon monoxide at least as effectively as and even more effectively than comparable platinum group metal catalysts, as shown, for example, in FIGS. 1a and 1b.

When the gas contains other VOCs, such as methanol, methyl ethyl ketone, butane, or butene, a base metal catalyst according to embodiments of the present invention were also able to achieve comparable conversions as the platinum group metal reference catalyst as long as the catalyst bed temperature reached a certain level, as shown, for example, in FIGS. 3-6.

The catalyst composition comprises at least one base metal catalyst. The at least one base metal catalyst may be selected from copper (Cu), iron (Fe), cobalt (Co), nickel (Ni), and chromium (Cr). In an exemplary embodiment of the present invention, the at least one base metal catalyst is copper. The discovery of the at least one base metal catalyst supported on the supports (described herein below) and promoted with at least one base metal promoter, such as manganese, eliminates the need for noble metals. The base metal catalyst may be added in the form of a nitrate or an acetate. In particular, the copper, for example, in the form of copper nitrate, may be impregnated on a support or coated on a pellet or monolith. Catalysts of the present invention demonstrate superior activity (e.g., they are highly active catalysts) and durability as compared to current commercial noble metal catalysts. For PTA tail-gas emission control, these catalysts are able to convert CO and VOCs at lower temperatures better than PGM catalysts at comparable temperatures. These catalysts also exhibit superior durability and longevity.

The catalyst composition comprises at least one base metal promoter. As used herein, "promoter" or "promoted" are understood to mean a substance that when added into a catalyst, increases the activity of the catalyst. The at least one base metal catalyst promoter may be selected from neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), or strontium (Sr). In one illustrative embodiment, the at least one base metal catalyst promoter is Mn. The at least one base metal catalyst promoter may be added, for example, in the form of a nitrate in solution or an acetate. For example, when using Mn, the Mn may be added in the form of Mn nitrate. The at least one base metal catalyst promoter and at least one base metal catalyst, e.g., copper, may be impregnated from an aqueous solution onto the oxide support material(s), may be added into a washcoat comprising the oxide support material (s), or may be impregnated into a support previously coated with the washcoat.

In an exemplary embodiment, copper is the at least one base metal catalyst, and manganese is the at least one base metal promoter. Without wishing to be bound to a particular theory, it is believed that by using the combination of Cu and Mn as the active catalytic components supported on the at least one oxide support material, the Cu and Mn provide increased activity of the catalyst, and Mn may further improve the durability of the catalyst. Additionally and significantly, the Mn appears to provide improved catalyst activity at reduced temperatures. Referencing FIGS. 1a and 1b, the Cu:Mn catalyst shows excellent VOC conversion at reduced temperatures, e.g., at less than 325° C.

The at least one base metal promoter and the at least one base metal catalyst are supported on an oxide support material. The oxide support material may comprise one or more of alumina, silica, zirconia, ceria, and titania. The oxide support materials may be alumina ($Al_2O_3$), silica ($SiO_2$) zirconia ($ZrO_2$), ceria ($CeO_2$), and titania ($TiO_2$), or mixtures of these or mixtures of these with other oxide materials such as perovskites, nickel oxide (NiO), manganese dioxide ($MnO_2$), praseodymium (III) oxide ($Pr_2O_3$). Thus, the oxide support material may include composite oxides or mixed oxides of two or more thereof (such as $CeZrO_2$ mixed oxides, $TiZrO_2$ mixed oxides, $TiSiO_2$ mixed oxides, and $TiAlO_x$ oxides where x is dependent on the ratio of $TiO_2$ to $Al_2O_3$). The oxide support material may not only serve as a support function, but may also serve a binder function. For example, alumina may act as both a support and a binder in an alumina and $CeZrO_2$ mixed oxide. The oxide support material may be slurried, or if more than one, the oxide support materials may be slurried together with water to form a washcoat.

The oxide support material may also be stabilized. Stabilizers may be selected from zirconium (Zr), lanthanum (La), aluminum (Al), yttrium (Y), praseodymium (Pr), neodymium (Nd), an oxide thereof, a composite oxide or mixed oxide of any two or more thereof, or at least one alkaline earth metal, e.g., barium (Ba). If each oxide support material is stabilized, the stabilizers may be the same or different. In one embodiment, the oxide support material is $Al_2O_3$ and $CeO_2$. Where the oxide support material is $Al_2O_3$, it may be alpha-, gamma-, beta-, delta-, or theta-$Al_2O_3$, for example. According to one embodiment, the oxide support material is La-stabilized $Al_2O_3$ and Zr-stabilized $CeO_2$. In another embodiment, the support material comprises 20 mole % La-stabilized $Al_2O_3$ and 80 mole % Zr-stabilized $CeO_2$. According to another embodiment, the support material comprises Ce and Zr present in about a 1:1 mole ratio. For example, in a mixed Zr-stabilized $CeO_2$, there would be about 50% Ce and about 50% Zr. More particularly, the support material may comprise Ce and Zr in exactly a 1:1 mole ratio.

In preparing a catalyst composition comprising at least one base metal promoter and at least one base metal catalyst supported on an oxide support material, the following method may be used. A washcoat may be prepared. An oxide support material support may or may not be milled. If milled, the oxide support material(s) may be milled to a particle size of less than about 20 μm or more particularly in a range of less than 15 μm. The oxide support material(s) may be formed into a slurry using water. The washcoat may be applied to a substrate, for example, in multiple passes or coats. The support may then be impregnated with an aqueous solution of at least one base metal catalyst, for example, copper, and at least one base metal promoter, for example, manganese. The aqueous solution may include copper nitrate and manganese nitrate. Alternatively, a salt, such as a manganese salt or copper salt, may be added directly to the washcoat before application.

Figure 1A:
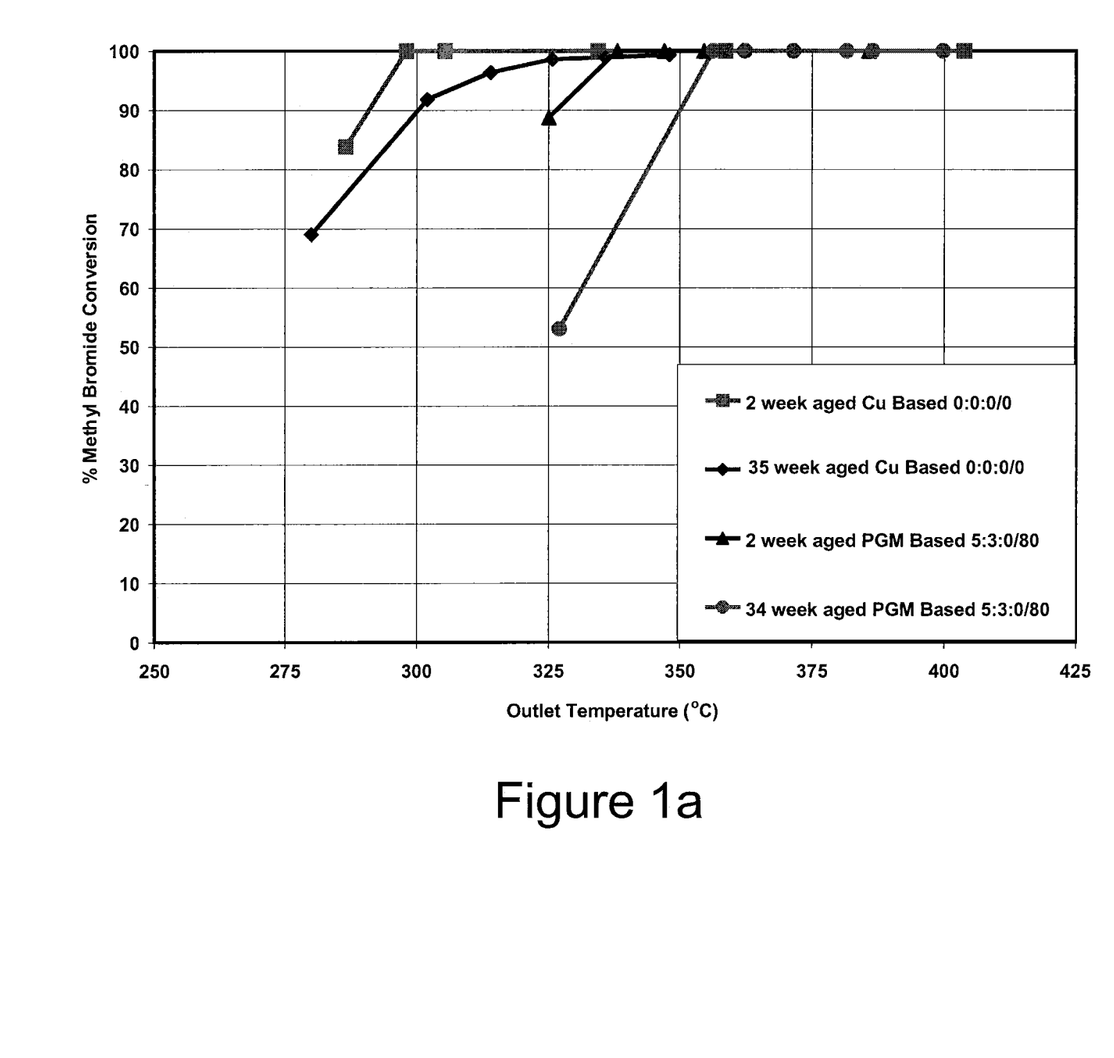
FIG. 1a is a graph illustrating the percentage of methyl bromide conversion for outlet temperatures and conditions simulating a PTA production process tail-gas for a copper-based catalyst according to an embodiment of the present invention as compared to a platinum group metal based catalyst.
Figure 1B:
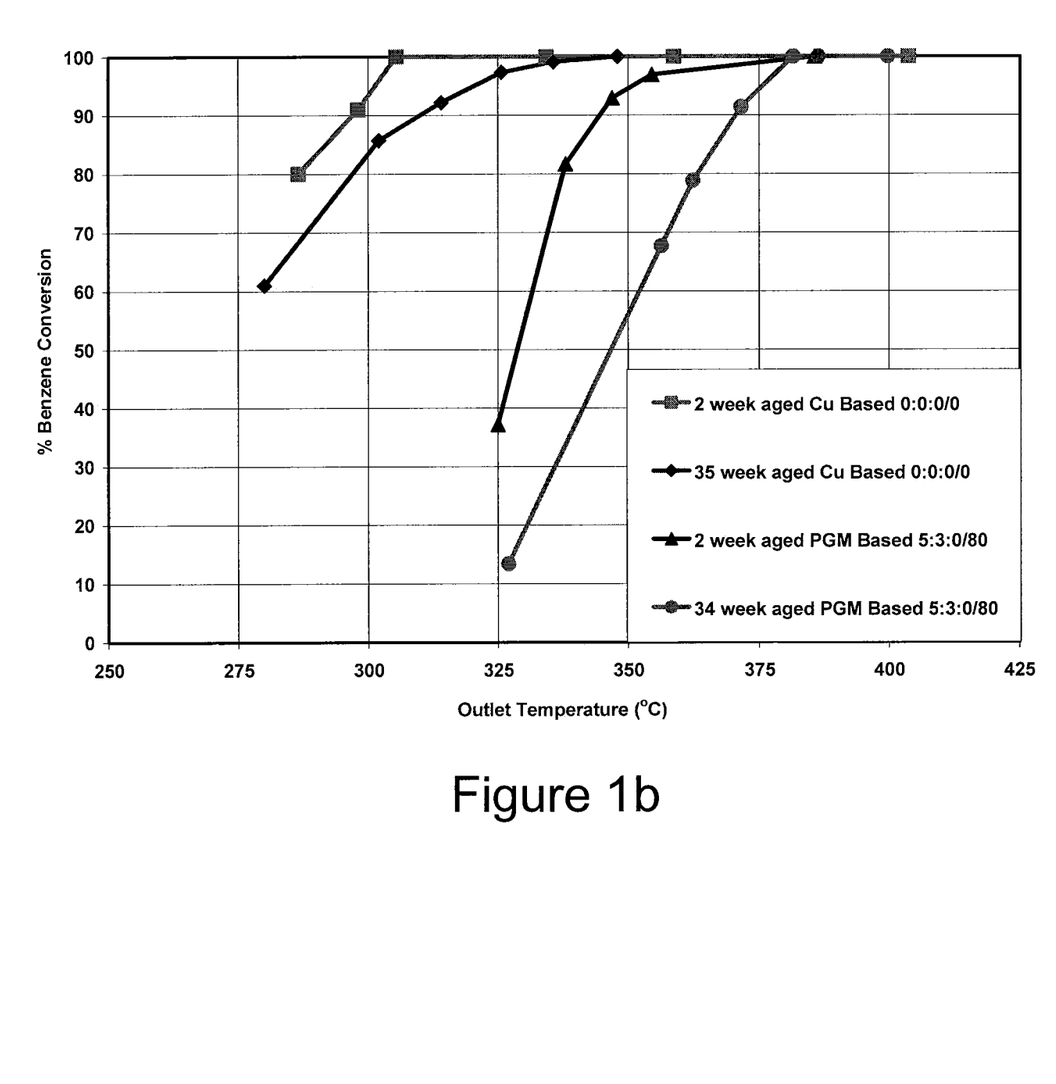
FIG. 1b is a graph illustrating the percentage of benzene conversion for outlet temperatures and conditions simulating a PTA production process tail-gas for a copper-based catalyst according to an embodiment of the present invention as compared to a platinum group metal based catalyst.

One advantageous aspect of the present invention is that the catalyst can function effectively in the absence of precious metals and in certain embodiments may function even more effectively than conventional catalysts containing precious metals. Accordingly, the catalyst composition may be free of platinum group metals (PGMs). For example, the Cu-based catalysts in embodiments of the present invention showed surprisingly effective conversion of CO and VOCs without using any platinum group metals. In fact, in certain embodiments, the Cu-based catalysts had better activity and better durability than the PGM catalysts. Referring now to FIGS. 1a and 1b, the copper based catalysts have been shown to demonstrate superior activity in comparison to the commercial platinum/palladium catalyst. This reduction in the amount of precious metal in the catalyst should result in significant costs savings in producing the catalyst compositions.

According to another embodiment, a catalyst composition for the oxidation of carbon monoxide (CO) and volatile organic compounds (VOC) comprises at least one base metal promoter and at least one base metal catalyst supported on an oxide support material comprising one or more of alumina, silica, zirconia, ceria, and titania. According to another embodiment, a catalyst composition for the oxidation of carbon monoxide (CO) and volatile organic compounds (VOC) consists essentially of at least one base metal promoter and at least one base metal catalyst supported on an oxide support material comprising one or more of alumina, silica, zirconia, ceria, and titania. "Consisting essentially of" is meant to exclude certain other unclaimed substituents such as platinum group metals.

The catalyst composition may be supported on a substantially inert substrate material, as generally known in the art. The substrate may be of any generally suitable form. For example, the substrate may comprise a flow through monolith, such as a ceramic or honeycomb structure, or the substrate may be in the form of foams, or the substrate may be in the form of pellets, fluidized bed particulates, or may comprise particles such as spheres or short extruded segments. The catalyst may be coated onto substrates or the catalysts may be extruded to form self-supported pellets or beads. As is known in the art, a catalyst, for example, a pellet catalyst may be replenished and replaced as necessary and as used.

The present invention provides a catalyst composition for the oxidation of, for example, CO, hydrocarbon, halocarbon, and VOC emissions often emitted from a variety of industrial and commercial processes. The catalyst may be placed in an appropriate oxidation device in which temperatures and flow rates may be controlled. As an effluent stream containing, for example, water, CO, and VOCs come into contact with the catalyst, the components of the effluent are generally converted to $CO_2$, $H_2O$, and for halocarbons, haloacid or halogen gas.

It is understood that the catalyst compositions may be utilized over a wide range of temperatures typically encountered in the exhaust from industrial, commercial or energy-generating processes. The catalyst, oxide support materials, and support should be stable over this wide range of temperature and specifically at high gas temperatures. As discussed above, the composition must also be stable and able to effectively function in a gas containing water vapor. Catalyst compositions of the present invention are able to withstand and work effectively in these environments, e.g., as typically encountered in a PTA production process tail-gas.

Compositions according to embodiments of the present invention have also been shown to be extremely durable even after weeks of aging. Aging may include, for example, prolonged exposures to high temperatures, moisture, and exposure to VOCs. A representative aging environment may include a temperature of about 500° C. with about 1.5% moisture content and 100 ppm of methyl bromide. The catalyst may be aged from 2 weeks to upwards of 35 weeks. Referring again to FIGS. 1a and 1b, it is evident that the Cu-based catalysts in embodiments of the present invention were more active than the comparable PGM based catalysts even after significant aging.

EXAMPLES

Although the invention is illustrated and described herein with reference to specific embodiments, the invention is not intended to be limited to the details shown. Rather, various modifications may be made in the details within the scope and range of equivalents of the claims and without departing from the invention.

Example 1

An oxide, alumina, was milled to a nominal particle size of less than 15 microns to form a slurry. The slurry was washcoated onto a ceramic monolithic substrate with 400 cells per square inch to achieve a loading of 2.75 grams per cubic inch of the substrate. The block was dried at 60° C. and fired at 500° C. Subsequently, the block was impregnated with a mixture of aqueous solution of Cu nitrate and Mn nitrate. The target loadings were 0.22 grams of CuO and 0.45 grams of MnO per cubic inch of the substrate. The block was dried at 60° C. and fired at 500° C. for 2 hours.

Example 2

A La-stabilized alumina and a $CeZrO_2$ mixed oxide were milled separately to a nominal particle size of <15 microns to form slurries. These two slurries were mixed together to form a washcoat which contained 20% La-stabilized alumina and 80% $CeZrO_2$ mixed oxide. The washcoat was coated onto a ceramic monolithic substrate with 400 cells per square inch to achieve a loading of 2.75 grams per cubic inch of the substrate. After dried and fired, the block was impregnated with Cu and Mn following the procedures listed above in Example 1.

Example 3

This example was the same as Example 2, except that a $TiZrO_2$ mixed oxide was used to replace the $CeZrO_2$ mixed oxide.

Example 4

This example was the same as Example 2, except that a $TiSiO_2$ mixed oxide was used to replace the $CeZrO_2$ mixed oxide.

Example 5

This example was the same as Example 2, except that a $TiAlO_x$ mixed oxide was used to replace the $CeZrO_2$ mixed oxide.

Example 6

In this embodiment, a first oxide, La-stabilized alumina, was milled to a nominal particle size of <15 microns. A second oxide, $CeZrO_2$ mixed oxide, was separately milled to a nominal particle size of <15 microns. The separately-milled oxides were blended and slurried. Mn acetate crystals were added and mixed until they were completely dissolved to form a uniform washcoat. The final washcoat contained 17% La-stabilized alumina, 69% $CeZrO_2$ mixed oxide, and 14% MnO. The washcoat was applied to monolithic substrates with 400 cells per square inch to achieve a loading of 3.20 grams per cubic inch of the substrate. The block was dried at 60° C. and fired at 500° C. Subsequently, the block was impregnated with an aqueous solution of Cu nitrate to achieve a Cu loading of 0.22 gram of CuO per cubic inch of the substrate. The block was dried at 60° C. and fired at 500° C. for 2 hours.

Example 7

In this embodiment, a first oxide, La-stabilized alumina, was milled to a nominal particle size of <15 microns. A second oxide, $CeZrO_2$ mixed oxide, was separately milled to a nominal particle size of <15 microns. The separately-milled oxides were blended and slurried. Mn acetate crystals were added and mixed until they were completely dissolved to form a uniform slurry. Subsequently, Cu acetate crystals were added to the above slurry and mixed until they were completely dissolved to form a uniform washcoat. The final washcoat contained 16% La-stabilized alumina, 64% $CeZrO_2$ mixed oxide, 13% MnO, and 7% CuO. The washcoat was applied to monolithic substrates with 400 cells per square inch to achieve a loading of 3.42 grams per cubic inch of the substrate. The block was dried at 60° C. and fired at 560° C. for 2 hours.

Example 8

Referring now to FIGS. 1a and 1b, a Cu-based catalyst was prepared containing Cu supported on $Al_2O_3$ and $CeZrO_2$ oxides promoted with Mn, similarly to Example 2 or Example 6. The composition contained no platinum group metals. A commercial Pt50Pd30 catalyst (Pt 50 $g/ft^3$ and Pd 30 $g/ft^3$) was used as a comparative example (50:30:0/80). The ratios are for Pt:Pd:Rh, and the value after the ratio is the total PGM loading in $g\ ft^{-3}$.

FIGS. 1a and 1b illustrate the percentage of methyl bromide conversion and benzene conversion, respectively, for outlet temperatures and conditions simulating a PTA production process tail-gas for the copper-based catalyst as compared to the platinum group metal based catalyst.

The testing conditions simulated the conditions in a PTA production process tail-gas where the gas hourly space velocity (GHSV) equaled 25,000 $h^{-1}$, the pressure drop equaled 150 psig, and the gas mixture comprised 30 ppm methyl bromide, 10 ppm benzene, 100 ppm methane, 1000 ppm CO, 500 ppm methyl acetate, 1.5% $H_2O$, 4.0% $O_2$, and $N_2$ as the balance. The aging conditions were at 550° C. with 1.5% water, 100 ppm methyl bromide, and air as the balance for 2 weeks, 34 weeks, and 35 weeks, respectively, as indicated on FIGS. 1a and 1b.

As clearly shown in FIGS. 1a and 1b, the Cu-based catalyst showed superior activity to the commercial Pt50Pd30 catalyst for both newer catalysts (aged 2 weeks) and after a long period of aging (aged 34 or 35 weeks). Accordingly, the compositions appear to be extremely durable and maintain their activity even after weeks of aging.

Example 9

Figure 2A:
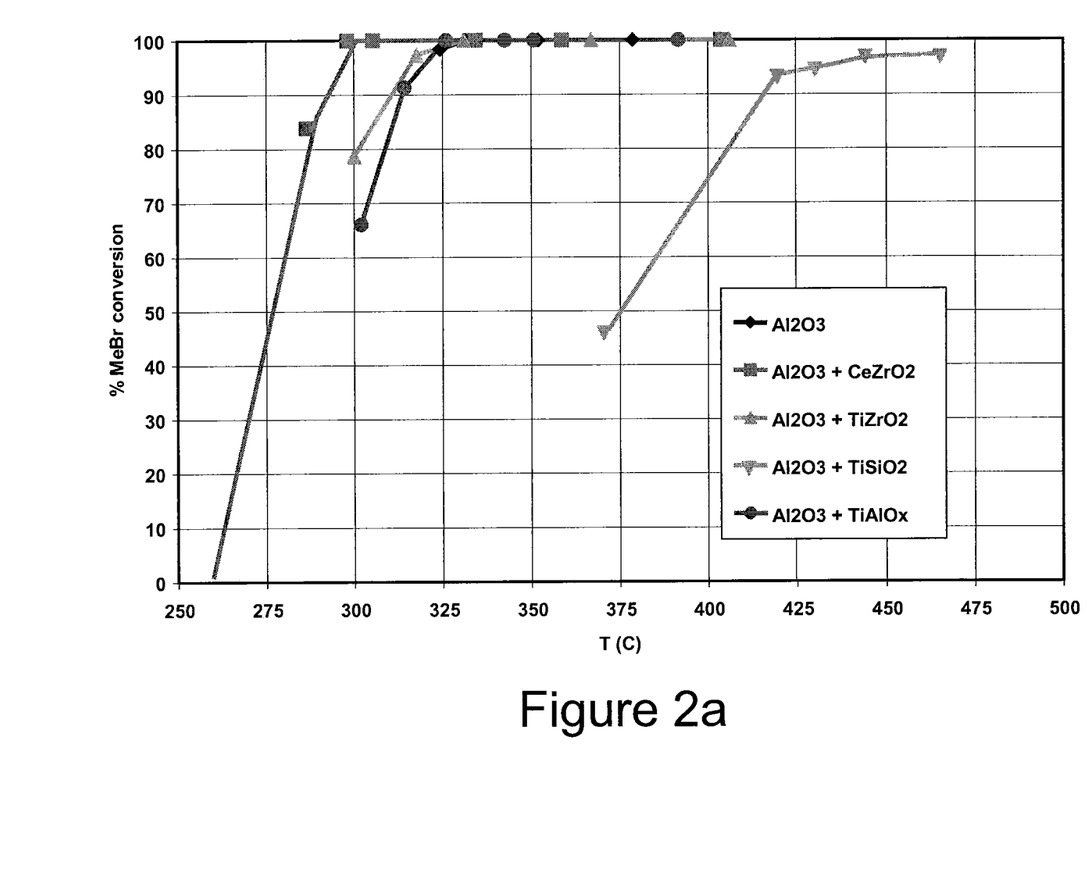
FIG. 2a is a graph illustrating the percentage of methyl bromide conversion for temperatures and conditions simulating a PTA production process tail-gas for support materials according to different embodiments of the present invention.
Figure 2B:
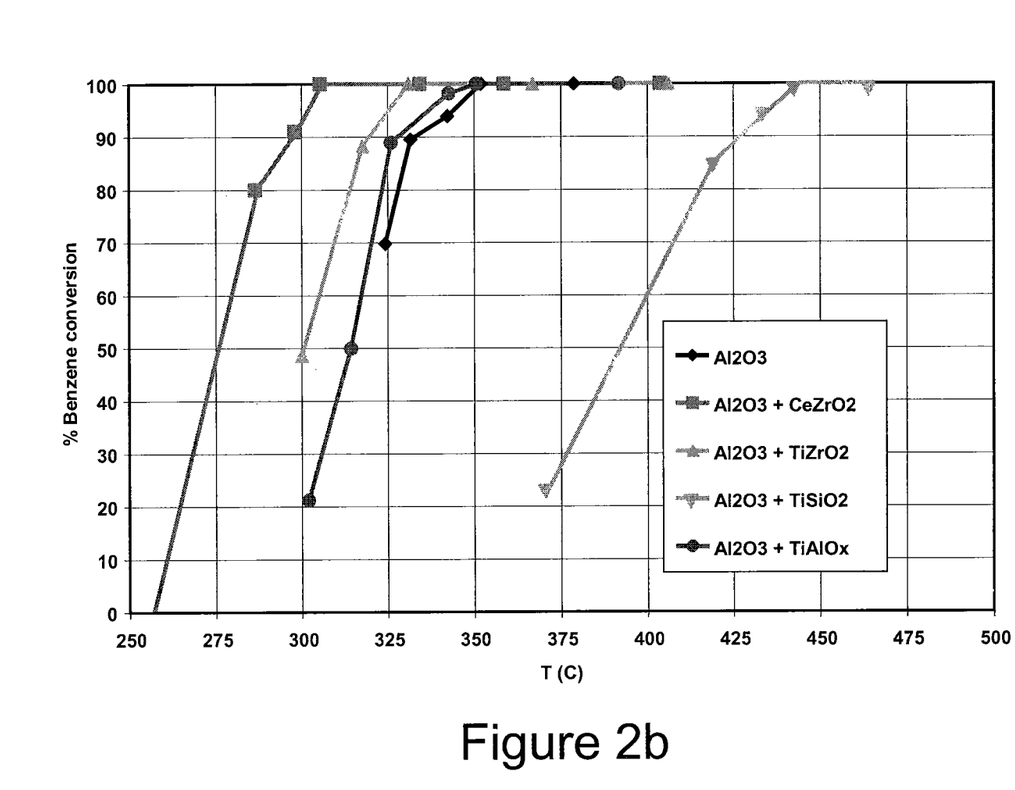
FIG. 2b is a graph illustrating the percentage of benzene conversion for temperatures and conditions simulating a PTA production process tail-gas for support materials according to different embodiments of the present invention.
Figure 2C:
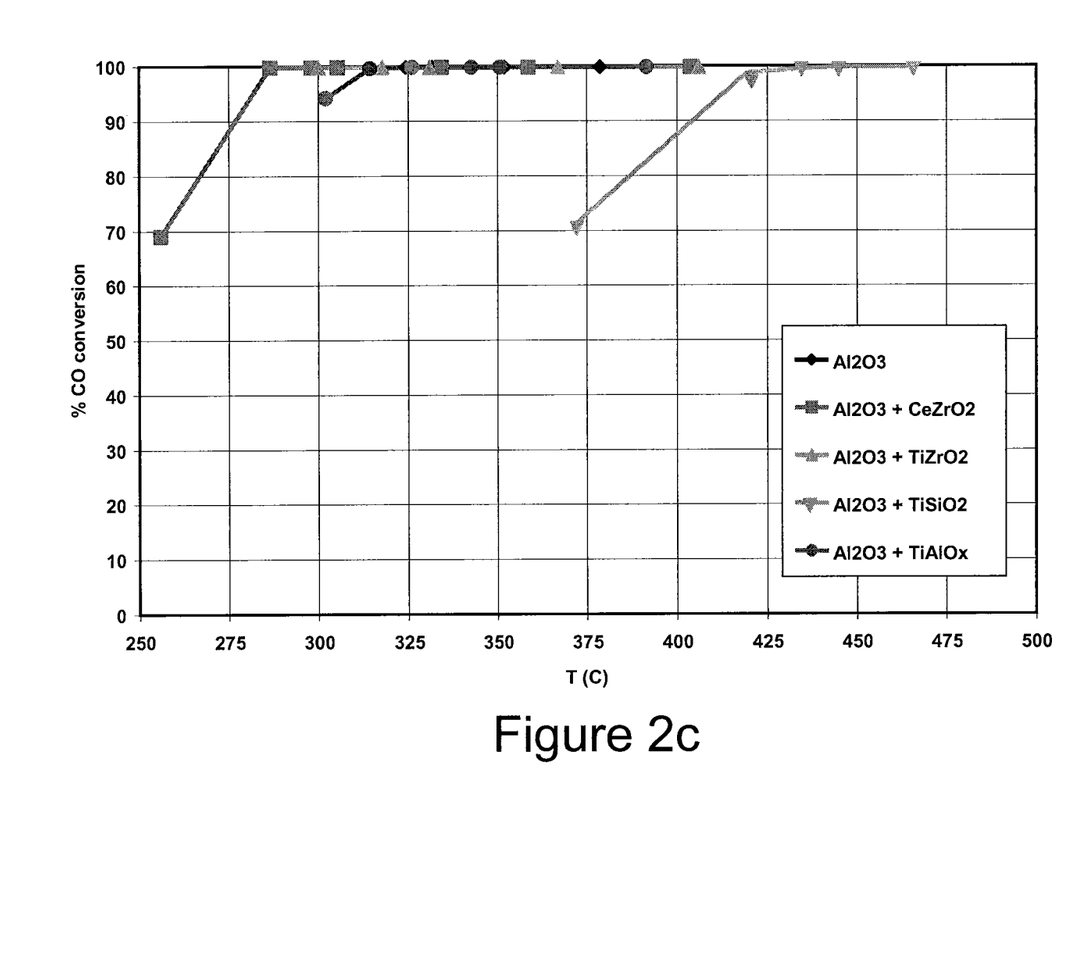
FIG. 2c is a graph illustrating the percentage of carbon monoxide conversion for temperatures and conditions simulating a PTA production process tail-gas for support materials according to different embodiments of the present invention.

Referring now to FIGS. 2a, 2b, and 2c, a Cu-based catalyst was prepared containing Cu supported on $Al_2O_3$ alone or with other identified oxides, and promoted with Mn. These Cu-based catalysts contained no platinum group metals. FIGS. 2a, 2b, and 2c illustrate the percentage of methyl bromide conversion, benzene conversion, and CO conversion, respectively, for temperatures and conditions simulating a PTA production process tail-gas for the different support materials. The support materials included (1) $Al_2O_3$ only; (2) 20% $Al_2O_3$+80% $CeZrO_2$ mixed oxide; (3) 20% $Al_2O_3$+80% $TiZrO_2$ mixed oxide; (4) 20% $Al_2O_3$+80% $TiSiO_2$ mixed oxide; and (5) 20% $Al_2O_3$+80% $TiAlO_x$ mixed oxide.

The testing conditions simulated the conditions in a PTA production process tail-gas where GHSV equaled 25,000 $h^{-1}$, the pressure drop equaled 150 psig, and the gas mixture comprised 30 ppm methyl bromide, 10 ppm benzene, 100 ppm methane, 1000 ppm CO, 500 ppm methyl acetate, 1.5% $H_2O$, 4.0% $O_2$, and $N_2$ as the balance. The aging conditions were at 550° C. with 1.5% water, 100 ppm methyl bromide, and air as the balance for 2 weeks.

As can be clearly seen in FIGS. 2a, 2b, and 2c, all identified oxides showed good catalytic activity of Cu:Mn supported on the oxides. Accordingly, Cu:Mn supported on oxide support materials are effective over a wide range of temperatures. It is also evident that the catalytic activity of Cu:Mn supported on the $Al_2O_3+CeZrO_2$ support was the most active catalyst.

Example 10

Figure 3:
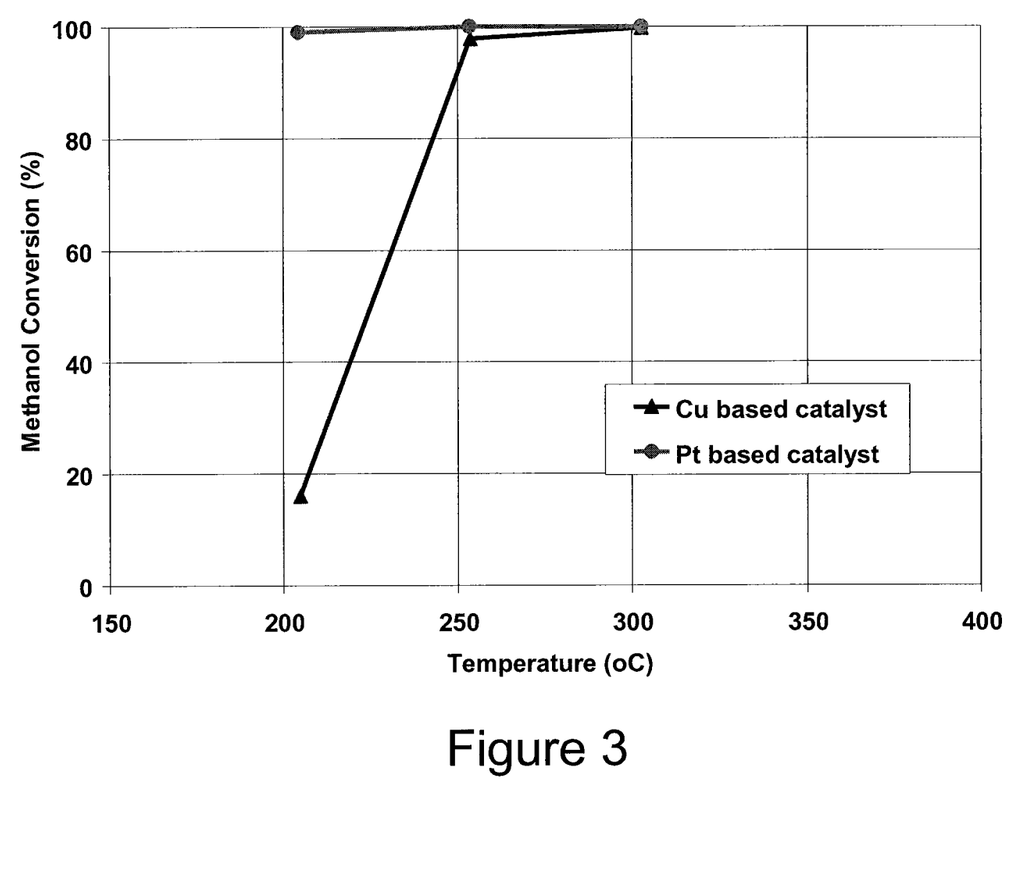
FIG. 3 is a graph illustrating the percentage of methanol conversion for temperatures for a copper-based catalyst according to an embodiment of the present invention versus a platinum group metal based catalyst.

Referring now to FIG. 3, a Cu-based catalyst was prepared containing Cu supported on $Al_2O_3$ and $CeZrO_2$ oxides promoted with Mn. The Cu-based catalyst contained no platinum group metals. A commercial platinum-based catalyst was used as a comparative example. FIG. 3 illustrates the percentage of methanol conversion as a function of the outlet temperatures for the copper-based catalyst as compared to a platinum group metal based catalyst.

In FIG. 3, the testing conditions included a GHSV equal to 50,000 $h^{-1}$ and the gas mixture comprised 1000 ppm methanol, 1000 ppm CO, 5% $H_2O$, 15% $O_2$, and $N_2$ as the balance. As clearly shown in FIG. 3, when the temperature reaches 300° C., the Cu:Mn catalyst can achieve 100% methanol conversion.

Example 11

Figure 4:
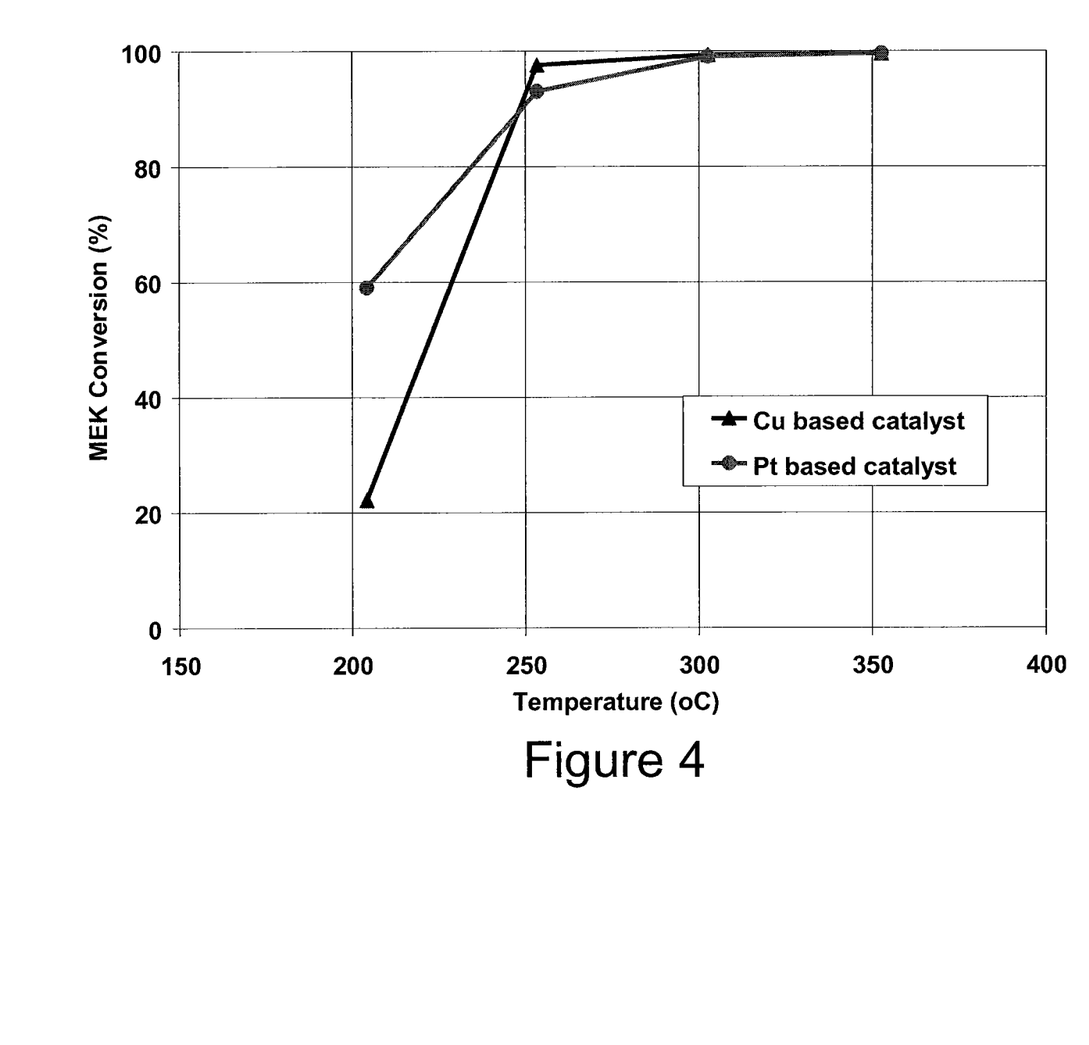
FIG. 4 is a graph illustrating the percentage of methyl ethyl ketone conversion for temperatures and conditions for a copper-based catalyst according to an embodiment of the present invention versus a platinum group metal based catalyst.

Referring now to FIG. 4, a Cu-based catalyst was prepared containing Cu supported on $Al_2O_3$ and $CeZrO_2$ oxides promoted with Mn. The Cu-based catalyst contained no platinum group metals. A commercial platinum-based catalyst was used as a comparative example. FIG. 4 illustrate the percentage of methyl ethyl ketone (MEK) conversion as a function of the outlet temperatures for the copper-based catalyst as compared to a platinum group metal based catalyst.

In FIG. 4, the testing conditions included a GHSV equal to 50,000 $h^{-1}$, and the gas mixture comprised 250 ppm methyl ethyl ketone, 1000 ppm CO, 5% $H_2O$, 15% $O_2$, and $N_2$ as the balance. As can be seen in FIG. 4, when the temperature reaches 300° C., the Cu:Mn catalyst is comparable to the platinum-based reference catalyst because both achieved about 100% MEK conversion. Accordingly, the Cu-based catalysts of the present invention showed surprisingly effective conversion of MEK without using any platinum group metals.

Example 12

Figure 5:
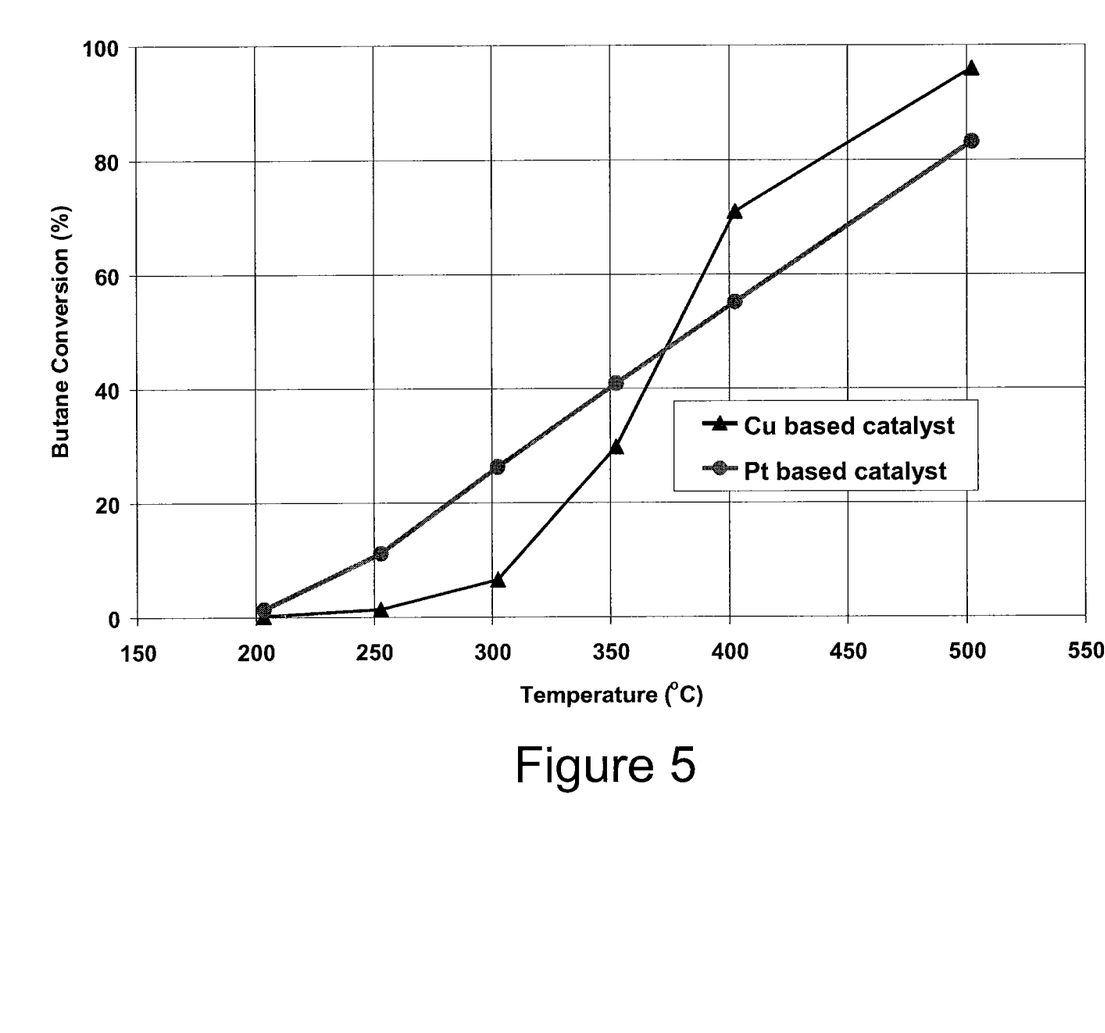
FIG. 5 is a graph illustrating the percentage of butane conversion for a copper-based catalyst according to an embodiment of the present invention versus a platinum group metal based catalyst.

Referring now to FIG. 5, a Cu-based catalyst was prepared containing Cu supported on $Al_2O_3$ and $CeZrO_2$ oxides promoted with Mn. The Cu-based catalyst contained no platinum group metals. A commercial platinum-based catalyst was used as a comparative example. FIG. 5 illustrates the percentage of butane conversion for the copper-based catalyst as compared to a platinum group metal based catalyst.

In FIG. 5, the testing conditions included a GHSV equal to 50,000 $h^{-1}$ and the gas mixture comprised 250 ppm butane, 1000 ppm CO, 5% $H_2O$, 15% $O_2$, and $N_2$ as the balance. As shown in FIG. 5, the Cu:Mn catalyst performed in a comparable manner to the platinum based catalyst. Accordingly, the at least one base metal catalyst, e.g., the Cu-based catalysts, of the present invention showed effective conversion of butane without using any platinum group metals.

Example 13

Figure 6:
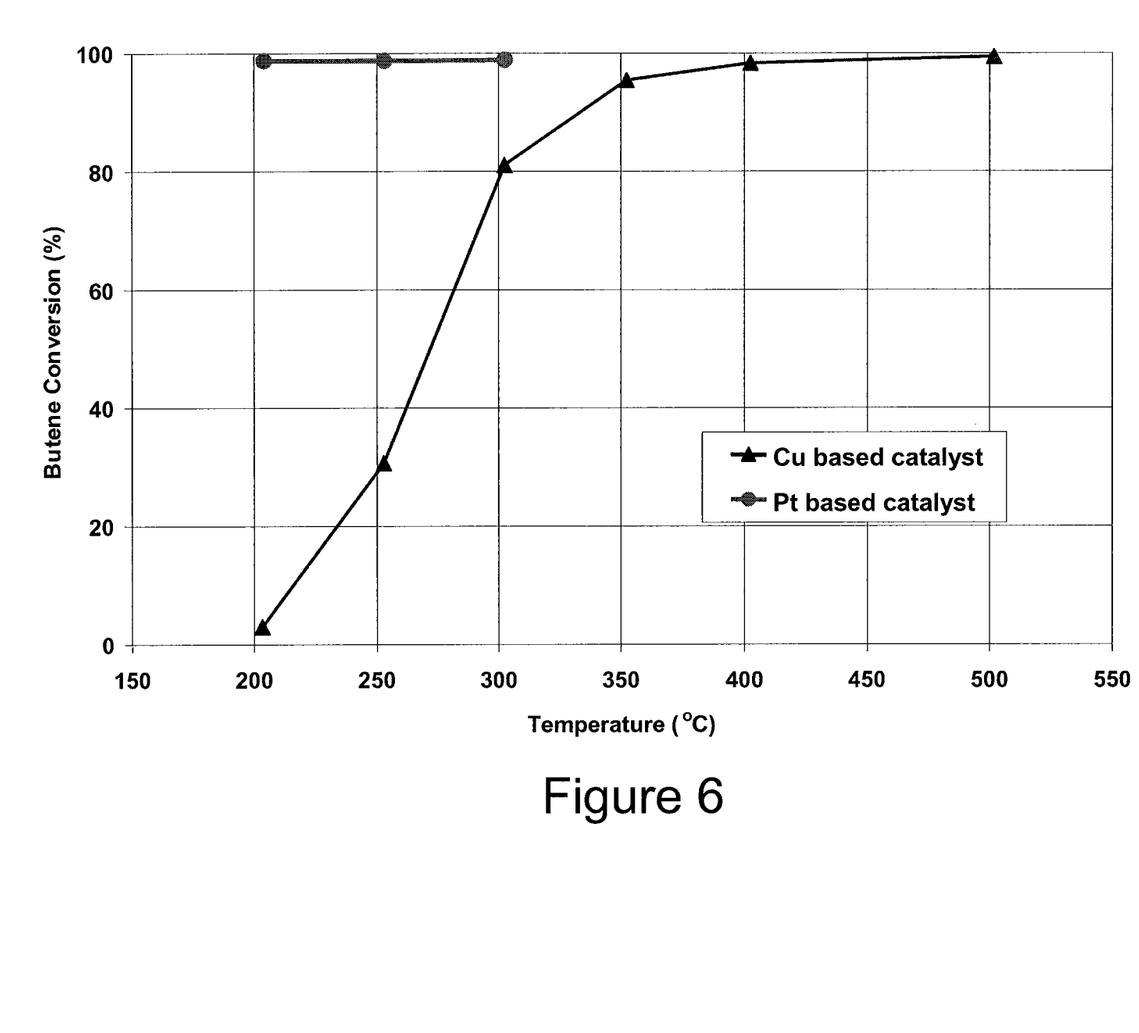
FIG. 6 is a graph illustrating the percentage of butene conversion for a copper-based catalyst according to an embodiment of the present invention versus a platinum group metal based catalyst.

Referring now to FIG. 6, a Cu-based catalyst was prepared containing Cu supported on $Al_2O_3$ and $CeZrO_2$ oxides promoted with Mn. The Cu-based catalyst contained no platinum group metals. A commercial platinum-based catalyst was used as a comparative example. FIG. 6 illustrates the percentage of butene conversion for the copper-based catalyst as compared to a platinum group metal based catalyst.

In FIG. 6, the testing conditions included a GHSV equal to 50,000 $h^{-1}$ and the gas mixture comprised 250 ppm butene, 1000 ppm CO, 5% $H_2O$, 15% $O_2$, and $N_2$ as the balance. As can be seen in FIG. 6, the Cu:Mn catalyst did not perform as effectively as the platinum based catalyst, but it did maintain good activity in converting the butene at higher temperatures, especially above 300° C.

Example 14

This example was the same as Example 2, except that iron nitrate, cobalt nitrate, or nickel nitrate were used to replace copper nitrate in each case. In particular, a La-stabilized alumina and a $CeZrO_2$ mixed oxide were milled separately to a nominal particle size of <15 microns to form slurries. These two slurries were mixed together to form a washcoat which contained 20% La-stabilized alumina and 80% $CeZrO_2$ mixed oxide. The washcoat was coated onto a ceramic monolithic substrate with 400 cells per square inch to achieve a loading of 2.75 grams per cubic inch of the substrate. After the block was dried and fired, the block was impregnated with a mixture of aqueous solution of Cu nitrate (or Fe nitrate, Co nitrate, or Ni nitrate is substituted, respectively) and Mn nitrate following the procedures listed above in Example 1.

Figure 7A:
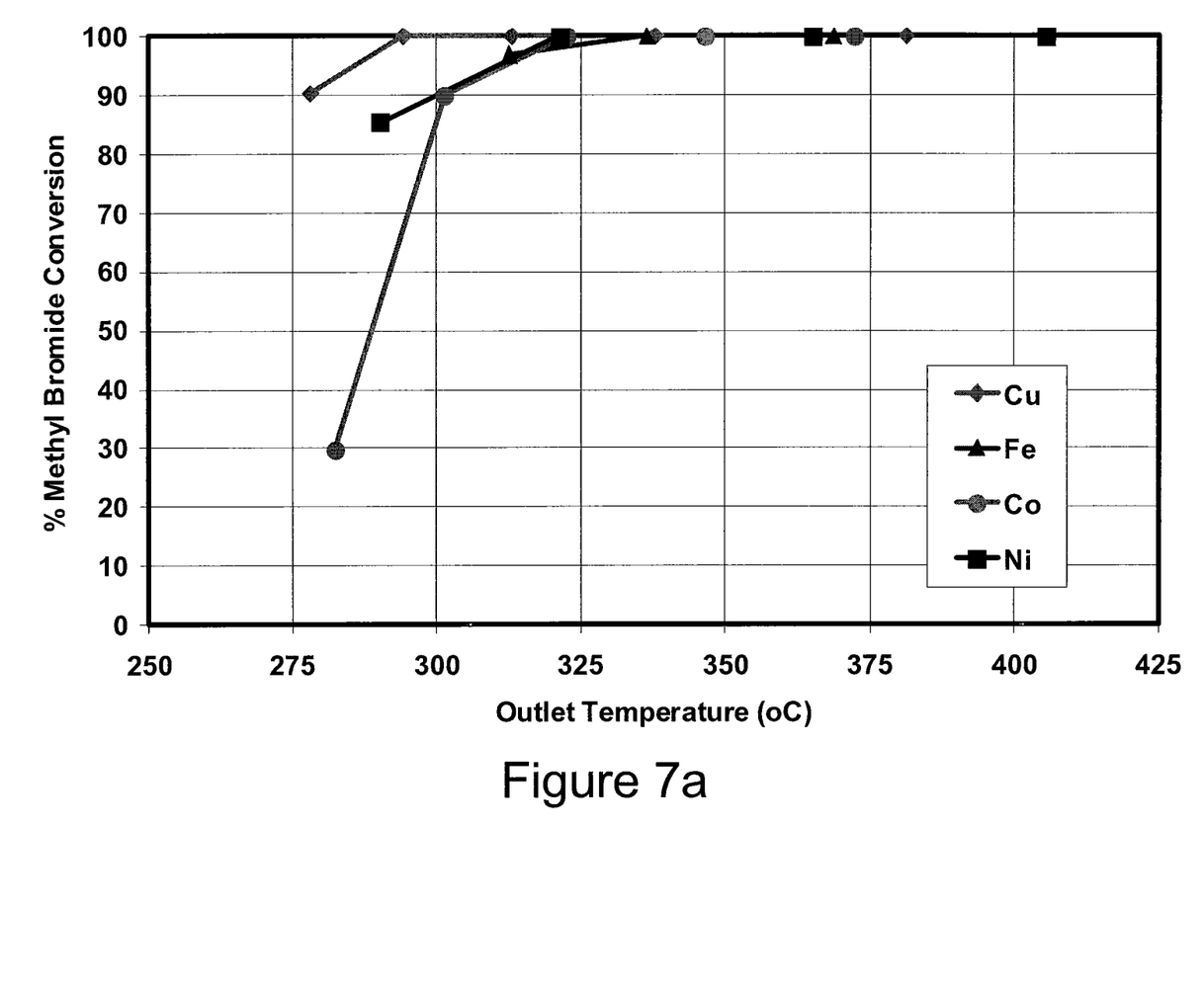
FIG. 7a is a graph illustrating the percentage of methyl bromide conversion for embodiments of the catalyst composition comprising copper, iron, cobalt, and nickel, respectively, as a base metal catalyst.
Figure 7B:
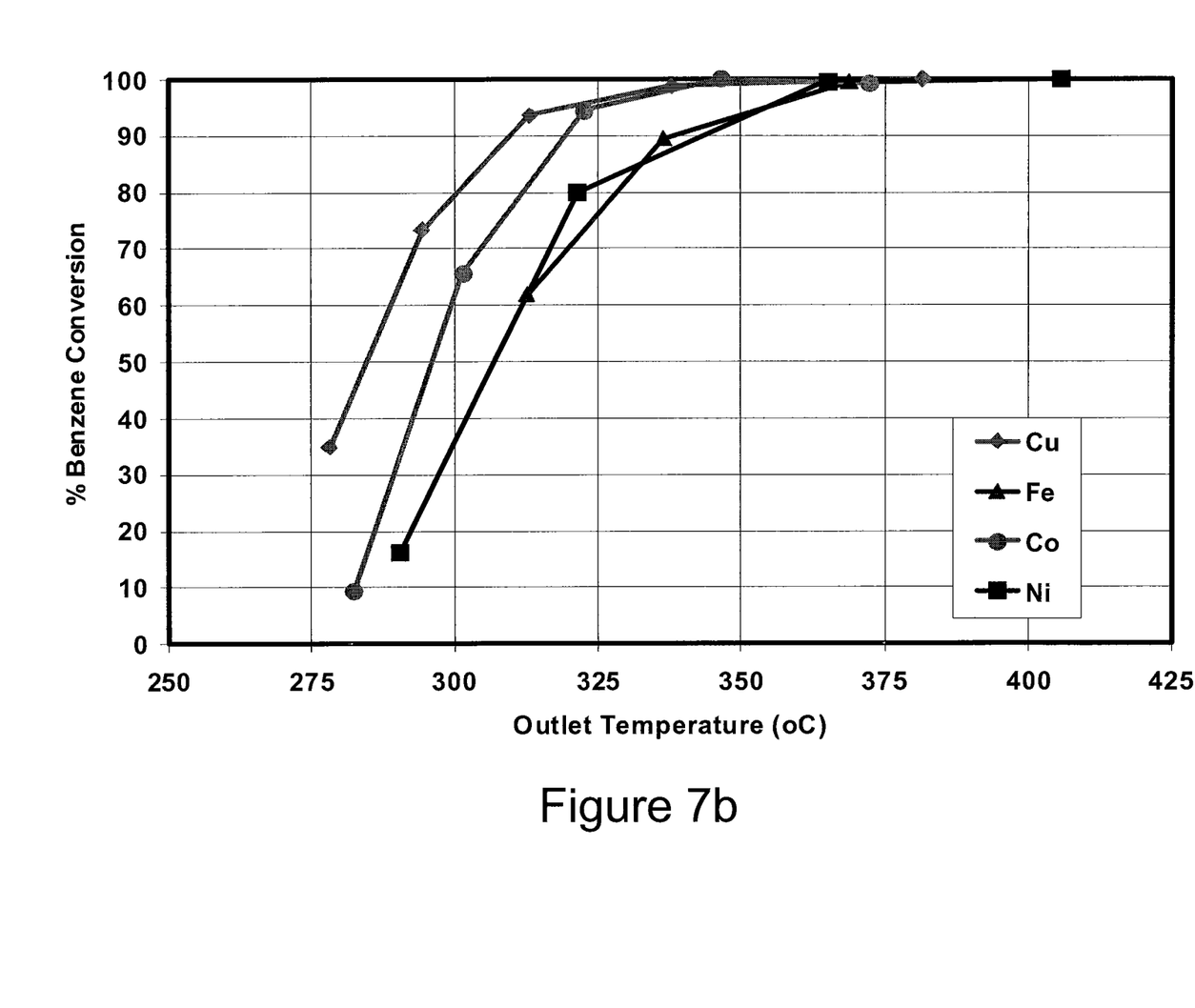
FIG. 7b is a graph illustrating the percentage of benzene conversion for embodiments of the catalyst composition comprising copper, iron, cobalt, and nickel, respectively, as a base metal catalyst.

Referring now to FIGS. 7a and 7b, FIG. 7a illustrates the percentage of methyl bromide conversion for catalysts with the base metal promoter and the base metal catalyst of copper, iron, cobalt, or nickel, respectively. FIG. 7B illustrates the percentage of benzene conversion for catalysts with the base metal promoter and the base metal catalyst of copper, iron, cobalt, or nickel, respectively. While it is evident that the copper-based catalyst demonstrated the best activity in converting the methyl bromide and benzene, the iron, cobalt, and nickel based catalysts also maintain good activity in converting methyl bromide and benzene.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A method for removing methyl bromide from a waste stream, the method comprising:
   contacting the waste stream with a catalyst composition consisting of manganese oxide and copper oxide impregnated onto an oxide support material consisting of lanthanum (La) stabilized Al2O3 and zirconium-stabilized ceria mixed oxide, wherein during manufacture of the catalyst manganese is impregnated onto the oxide support material from an aqueous solution comprising manganese nitrate or manganese acetate and copper is impregnated onto the oxide support material from an aqueous solution comprising copper nitrate or copper acetate;

such that the methyl bromide is oxidized by contact with the catalyst composition.

2. The method of claim 1, wherein said waste stream further comprises one or more of methyl acetate, methane, benzene, methanol, methyl ethyl ketone, butane, and butene.

3. The method of claim 1, wherein said waste stream further comprises methyl acetate, methane, and benzene.

4. The method of claim 1, wherein said waste stream further comprises methyl ethyl ketone.

5. The method of claim 1, wherein said waste stream further comprises butane.

6. The method of claim 1, wherein Ce and Zr are present in said oxide support material in a 1:1 mole ratio.

7. The method of claim 1, wherein said oxide support material consists of 20 mole % La-stabilized $Al_2O_3$ and 80 mole % Zr-stabilized $CeO_2$.

8. The method of claim 1, wherein the oxide support material also functions as a binder.

9. The method of claim 1, where the catalyst composition is supported on a substantially inert substrate material, wherein the substrate is a flow-through monolith.

10. The method of claim 9, wherein the waste stream is a tail gas from a purified terephthalic acid production process.

11. The method of claim 1, wherein the waste stream further contains CO and the CO is also oxidized.

12. The method of claim 2, wherein one or more of the methyl acetate, methane, benzene, methanol, methyl ethyl ketone, butane, and butene is oxidized.

13. A method as claimed in claim 1, wherein the waste stream comprises water vapor in an amount of 1.5 mole percent to 5 mole percent.

* * * * *